US009948893B2

United States Patent
Barzuza et al.

(10) Patent No.: US 9,948,893 B2
(45) Date of Patent: *Apr. 17, 2018

(54) BACKGROUND REPLACEMENT BASED ON ATTRIBUTE OF REMOTE USER OR ENDPOINT

(71) Applicant: Avaya Inc., Santa Clara, CA (US)

(72) Inventors: Tamar Barzuza, Tel Aviv (IL); Gal Eliraz-Lovonai, Brookline, MA (US); Ori Modai, Ramut-Hasharon (IL)

(73) Assignee: Avaya Inc., Santa Clara, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/092,404

(22) Filed: Apr. 6, 2016

(65) Prior Publication Data
US 2017/0142371 A1 May 18, 2017

Related U.S. Application Data

(63) Continuation-in-part of application No. 14/944,649, filed on Nov. 18, 2015.

(51) Int. Cl.
*G06K 9/34* (2006.01)
*H04N 7/15* (2006.01)
(Continued)

(52) U.S. Cl.
CPC ........... *H04N 7/152* (2013.01); *G06T 7/0081* (2013.01); *G06T 11/00* (2013.01); *H04L 65/605* (2013.01);
(Continued)

(58) Field of Classification Search
CPC ...... H04N 7/15; H04N 7/147; H04N 21/4788; G06T 7/10; G06T 7/194;
(Continued)

(56) References Cited

U.S. PATENT DOCUMENTS 6,798,897 B1 * 9/2004 Rosenberg ............... G06T 7/35
348/154
7,415,047 B1 8/2008 Levent-Levi et al.
(Continued)

OTHER PUBLICATIONS

U.S. Appl. No. 14/944,649, filed Nov. 18, 2015.
"70 Cool Photo Frames and Borders Photoshop Tutorials," www.photoshopwebsite.com, 2015, retrieved from https://web.archive.org/web/20150829025748/http://www.photoshopwebsite.com/photoshop-tutorials/70-cool-photo-frames-and-borders-photoshop-tutorials/, retrieved on Sep. 16, 2016, 26 pages.
(Continued)

*Primary Examiner* — Euengnan Yeh
(74) *Attorney, Agent, or Firm* — Sheridan Ross P.C.

(57) ABSTRACT

A telecommunication device includes an image capture system that captures an image of a local participant in a telecommunication session, the image comprising foreground and background images defined by plural pixels, each of the pixels having a pixel magnitude related to a sample of the image at a spatial location of the respective pixel and a background modifier that segments plural pixels of the captured image into foreground and background sets of pixels, replaces the background set of pixels with a template set of pixels to form a new background set of pixels, selected pixels in the template set of pixels having a different magnitude than a magnitude of the corresponding pixel in the background set of pixels replaced by the selected pixel, and combines the new background set of pixels with the foreground set of pixels to form modified image information for transmission to a remote endpoint. A background selector selects the template set of pixels from among multiple template sets of pixels based on an attribute of a remote endpoint or remote participant associated with the remote endpoint.

20 Claims, 7 Drawing Sheets

(51) Int. Cl.
*G06T 11/00* (2006.01)
*G06T 7/00* (2017.01)
*H04L 29/06* (2006.01)

(52) U.S. Cl.
CPC ............... *G06T 2207/20144* (2013.01); *G06T 2207/20212* (2013.01)

(58) Field of Classification Search
CPC ........... G06T 2207/20021; G06T 2207/20112; G06K 9/00744; G06K 9/342
See application file for complete search history.

(56) References Cited

U.S. PATENT DOCUMENTS

| | | | |
|---|---|---|---|
| 7,461,126 | B2 | 12/2008 | Berkeland et al. |
| 7,492,731 | B2 | 2/2009 | Hagendorf |
| 7,631,039 | B2 | 12/2009 | Eisenberg |
| 7,979,528 | B2 | 7/2011 | Eisenberg et al. |
| 8,145,770 | B2 | 3/2012 | Hagendorf |
| 8,208,004 | B2 | 6/2012 | Hagendorf et al. |
| 8,208,410 | B1 | 6/2012 | Hagendorf |
| 8,212,856 | B2 | 7/2012 | Modai et al. |
| 8,233,028 | B2 | 7/2012 | Erhart et al. |
| 8,319,820 | B2 | 11/2012 | Wiener et al. |
| 8,464,053 | B2 | 6/2013 | Davis et al. |
| 8,483,044 | B2 | 7/2013 | Ben-Zedeff et al. |
| 8,612,819 | B2 | 12/2013 | Ben-Zedeff et al. |
| 8,982,177 | B2 | 3/2015 | Modai et al. |
| 9,124,762 | B2* | 9/2015 | Cutler .................... H04N 7/142 |
| 2009/0051754 | A1 | 2/2009 | Levent-Levi et al. |
| 2010/0066807 | A1 | 3/2010 | Eisenberg |
| 2011/0153735 | A1 | 6/2011 | Eisenberg |
| 2012/0026277 | A1* | 2/2012 | Malzbender ........... H04N 7/147 348/14.07 |
| 2013/0166742 | A1 | 6/2013 | Wiener et al. |
| 2013/0301918 | A1* | 11/2013 | Frenkel ................. G06T 7/0081 382/180 |
| 2014/0160225 | A1 | 6/2014 | Baldelli et al. |
| 2015/0067817 | A1 | 3/2015 | Modai |
| 2015/0264357 | A1 | 9/2015 | Alfonso |

OTHER PUBLICATIONS

Creating Photo Borders in Photoshop With Masks and Filters, www.photoshopessentials.com, 2015, retrieved from https://web.archive.org/web/20150716071648/http://www.photoshopessentials.com/photo-effects/photo-borders, retrieved on Sep. 16, 2016, 20 pages.

"Face Detection and Tracking Using CAMShift," Mathworks, 2015, retrieved from http://www.mathworks.com/help/vision/examples/face-detection-and-tracking-using-camshift.html, retrieved on Sep. 16, 2016, 5 pages.

"Human Proportions," RealColorWheel.com, 2014, retrieved from http://www.realcolorwheel.com/human.htm, retrieved on Sep. 16, 2016, 25 pages.

"Viola-Jones Face Detection," 5KK73 GPU Assignment, 2012, retrieved from https://sites.google.com/site/5kk73gpu2012/assignment/viola-jones-face-detection, retrieved on Sep. 16, 2016, 9 pages.

Official Action for U.S. Appl. No. 14/944,649, dated Jan. 26, 2017 12 pages.
Official Action for U.S. Appl. No. 14/944,649, dated May 15, 2017.
Notice of Allowance for U.S. Appl. No. 14/944,649, dated Aug. 25, 2017 9 pages.

* cited by examiner

BACKGROUND REPLACEMENT BASED ON ATTRIBUTE OF REMOTE USER OR ENDPOINT

CROSS REFERENCE TO RELATED APPLICATION

The present application is a continuation-in-part of U.S. patent application Ser. No. 14/944,649, filed Nov. 18, 2015, entitled "SEMI-BACKGROUND REPLACEMENT BASED ON ROUGH SEGMENTATION", which is incorporated herein by this reference in its entirety.

FIELD

The disclosure relates generally to video communication and particularly to participant image modification in video telecommunication.

BACKGROUND

Video communication is designed to facilitate head-and-shoulder participants joining from desktop environments. Normally in such environments, videos of participants are captured by one or more cameras that are located on their screens or in its vicinity. The vast majority of such cameras apply an aspect ratio of 16:9.

The resulting captured video image of the participant can undesirably include a significant portion of the background of the participant in the captured video. For example, participants joining from home offices are forced to disclose their private environments in the captured video. In another example, participants from business offices desire to use, as a background, a company roll-up to include promotional information in the captured video.

SUMMARY

These and other needs are addressed by the various aspects, embodiments, and/or configurations of the present disclosure. The present disclosure is directed to a semi-background or complete background replacement telecommunications device.

A telecommunication device can include:
(a) a microprocessor;
(b) an image capture system that captures an image of a local participant in a telecommunication session, the image including foreground and background images defined by plural pixels, each of the pixels having a pixel magnitude related to a sample of the image at a spatial location of the respective pixel;
(c) a background modifier that:
(i) segments plural pixels of the captured image into foreground and background sets of pixels,
(ii) replaces the background set of pixels with a template set of pixels to form a new background set of pixels, selected pixels in the template set of pixels having a different magnitude than a magnitude of the corresponding pixel in the background set of pixels replaced by the selected pixel, and
(iii) combines the new background set of pixels with the foreground set of pixels to form modified image information; and
(d) a background selector that selects the template set of pixels from among multiple template sets of pixels based on an attribute of a remote endpoint or remote participant associated with the remote endpoint; and
(e) an output to provide the modified image information to a remote endpoint and/or to a display to display the modified image information to the local participant.

A telecommunication device can include:
(a) an input that receives a captured 2-dimensional image of a local participant in a telecommunication session, the image including the foreground and background images defined by plural pixels;
(b) a background modifier that:
(i) segments the plural pixels of the captured image into foreground and background sets of pixels based on spatial coordinates of the pixels,
(ii) replaces the background set of pixels with a template set of pixels to form a new background set of pixels, and
(iii)
combines the new background set of pixels with the foreground set of pixels to form modified image information.

The pixel magnitude can be one or more of a pixel value, color plane, and colormap index of the corresponding pixel.

The captured image can be captured by a single 2-dimensional camera, and the segmentation of the plural pixels of the captured image into foreground and background sets of pixels can be based on spatial coordinates of the pixels and independent of pixel magnitudes.

The foreground image can include pixels defining an image of the local participant, and the background image can include pixels defining one or more background objects.

The foreground set of pixels can include pixels defining the image of the local participant and part of the one or more background objects.

The background set of pixels can include pixels defining the other part of the one or more background objects.

The segmentation can be based on a selected boundary dividing the background image information into first and second subsets of background image information. The pixels in the first subset of background image information are in the foreground set of pixels, and the pixels in the second subset of background image information are in the background set of pixels.

A spatial position of the boundary can be related to a dimension of a detected face of the local participant.

The spatial position of the boundary can spatially move across multiple frames based on movement of the local participant. Movement of the local participant can be tracked by tracking movement of a selected facial feature of the local participant. The boundary can spatially move only when a degree of spatial displacement of the local participant image from a selected position is at least a selected threshold.

The background modifier can modify magnitudes of the pixels at the boundary to provide a desired visual effect. Some of the pixels having modified magnitudes are in the foreground set of pixels and/or in the new background set of pixels.

The attribute of a remote endpoint or remote participant associated with the remote endpoint can be an identity of the remote participant, an association of the remote participant to the local participant or another entity, an electronic address associated with the remote endpoint, or a combination thereof.

The background selector can determine the attribute from a signal exchanged between the local and remote endpoint, input received by the local endpoint from the local or remote participant, face recognition based on an image of the remote participant, content analysis of audio information and/or video information of the telecommunication session, content analysis of a presentation displayed during the telecommunication session, or a combination thereof.

The background selector can select the template set of pixels from among the multiple template sets of pixels by mapping the determined attribute against associations of sets of one or more attributes against a corresponding template set of pixels.

Input of the local participant can be received to alter a spatial position of the boundary from a first position selected automatically by the background modifier to a second position selected manually by the local participant.

A contact center can include:

(a) a microprocessor; and (b) a computer readable medium, coupled to the microprocessor, that comprises:

(i) a work assignment engine that programs the microprocessor to assign work items, the work items comprising video calls with customer communication devices, to selected ones of agent communication devices to service the assigned work item;

(ii) an input interface that programs the microprocessor to receive a captured image of an agent from an agent communication device, the agent communication device selected by the work assignment engine for a telecommunication session with a selected customer communication device, the image comprising foreground and background images defined by plural pixels, each of the pixels having a pixel magnitude related to a sample of the image at a spatial location of the respective pixel;

(iii) a background selector that programs the microprocessor to select a template set of pixels from among multiple template sets of pixels based on an attribute of a selected customer communication device or a customer associated with the selected customer communication device; and (iv) a background modifier that programs the microprocessor to segment the plural pixels of the captured image into foreground and background sets of pixels based on spatial coordinates of the pixels, replace the background set of pixels with the selected template set of pixels to form a new background set of pixels and combine the new background set of pixels with the foreground set of pixels to form modified image information; and (v) an output interface that programs the microprocessor to provide the modified image information to the selected customer communication device.

The present disclosure can provide a number of advantages depending on the particular aspect, embodiment, and/or configuration. The concepts of the present disclosure can provide semi-background replacement in substantial real-time, even for images captured by a 2-dimensional camera and even when the local participant has a background that is a color or includes one or more colors other than green. The background surrounding and in proximity to the local participant, for instance, can have no more than about 75% green pixels, more typically no more than about 65% green pixels, and even more typically no more than about 55% green pixels. The concepts compromise on finding the precise segmentation of the participant with a 2-dimensional camera and thereby can overcome the faults (such as artifacts, poor user experience, non-real-time and complex computation, etc.) that are inhered in precise segmentation. The concepts can use artistic visual effects to compensate for the visual differences in the background resulting from rough segmentation. The concepts can block background images and thereby maintain local participant privacy.

These and other advantages will be apparent from the disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The terms "instant message" and "instant messaging" refer to a form of real-time text communication between two or more people, typically based on typed text.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.\

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
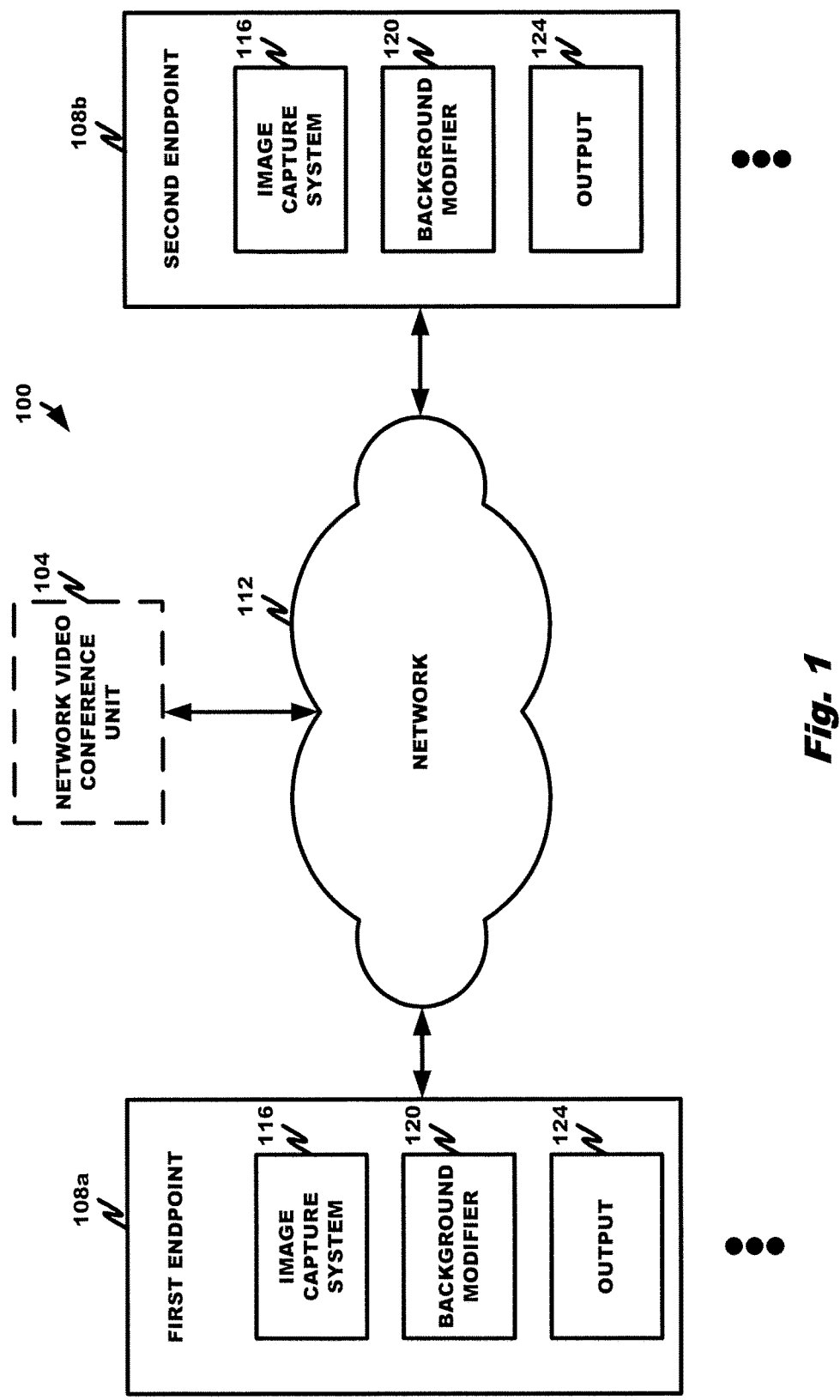
FIG. 1 is a block diagram depicting a system configuration according to an embodiment of the disclosure.

The conferencing system 100 of FIG. 1 includes an optional network video conference unit 104 and at least first and second endpoints 108a,b, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point, a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU manages multiple endpoints at once, coordinates the video data processing of the multiple endpoints, and forwards the flow of media streams among the multiple endpoints. The MCU conducts group video conferences under the principle of mixing media streams, i.e. mixing and re-encoding participants' video conferencing streams in real time. For example, the MCU can create a picture-in-picture effect. The MCU includes a multipoint controller ("MC") and optionally one or more multipoint processors ("MPs"). The MCs coordinate media stream processing parameters between endpoints and typically support the H.245 protocol. The MPs process, mix and switch multimedia streams.

In contrast, a VCS often implements a multiplexing pattern of the data streams, which implies no transcoding. The VCS typically redirects the media streams of the video conference participants. The compression/decompression and media stream mixing functions are performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first and second endpoints 108a, 108b, . . . can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of local participants. Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT Embedded Server™, and XT Endpoint™ with embedded server products by Avaya, Inc. that can be modified as set forth herein.

The optional network video conference unit 104 and first and second endpoints 108a and 108b are connected by the network 112. The network 112 can be a local area network ("LAN"), a wide area network ("WAN"), a wireless network, a cable network, a telephone network, the Internet, and/or various other suitable networks in which a video conferencing system can be implemented.

Each of the first and second endpoints 108a,b include an image capture system 116, background modifier 120, and output 124.

The image capture system 116 can be any image capturing device, such as one or more still or video cameras capable of capturing 2-dimensional or 3-dimensional image information. As will be appreciated, image information typically includes plural pixels, with each pixel having an x,y,z spatial position or physical coordinates in the captured image and represents a sample of the image portion corresponding to the physical coordinates. In some contexts, the image portion sample refers to the entire set of component intensities for a spatial position. In other words, each of the pixels that represents an image sample stored inside a computer normally has a pixel value which describes how bright that pixel is or the pixel intensity and/or what color it should be. In the simplest case of binary images, the pixel value is a 1-bit number indicating either foreground or background. For a grayscale image, the pixel value is a single number that represents the brightness of the pixel. The most common pixel format is the byte image, where this number is stored as an 8-bit integer giving a range of possible values from 0 to 255. Typically zero is taken to be black, and 255 is taken to be white. Pixel values failing in the range of 0 to 255 make up the different shades of gray. To represent color images, separate red, green and blue components are specified for each pixel (assuming an RGB colorspace), and the pixel "value" is a vector of three numbers. Often the three different components are stored as three separate "grayscale" images known as color planes (one for each of red, green and blue), which are recombined when displaying or processing. Multi-spectral images can contain even more than three components for each pixel, and by extension these are stored in the same way, namely as a vector pixel value or as separate color planes. The actual grayscale or color component intensities for each pixel may not actually be stored explicitly. Often, all that is stored for each pixel is an index into a colormap in which the actual intensity or colors can be looked up. In some contexts (such as descriptions of camera sensors), the term pixel is used to refer to a single scalar element of a multi-component representation (more precisely called a photosite in the camera sensor context.

The background modifier 120 processes the captured image information and, by rough segmentation, segments it between foreground and background image information, or foreground and background pixel sets. Foreground image information typically is the image of the local participant while background image information typically is the background of the local participant. The background modifier 120 substitutes or replaces the segmented background image information with a selected template, combines the template-replaced background image information with the foreground image information to produce modified image information. The user configurable and selectable template can be any design, such as black pixels, pixels of another color, plural colors and/or patterns, promotional information, and the like. In any event, the template pixel values are different from the pixel values of the corresponding replaced background pixels. The output 124 provides the modified image information to the local participant via a local display and/or transmits the modified image information to the remote participant for viewing on the remote participant's display.

Figure 2:
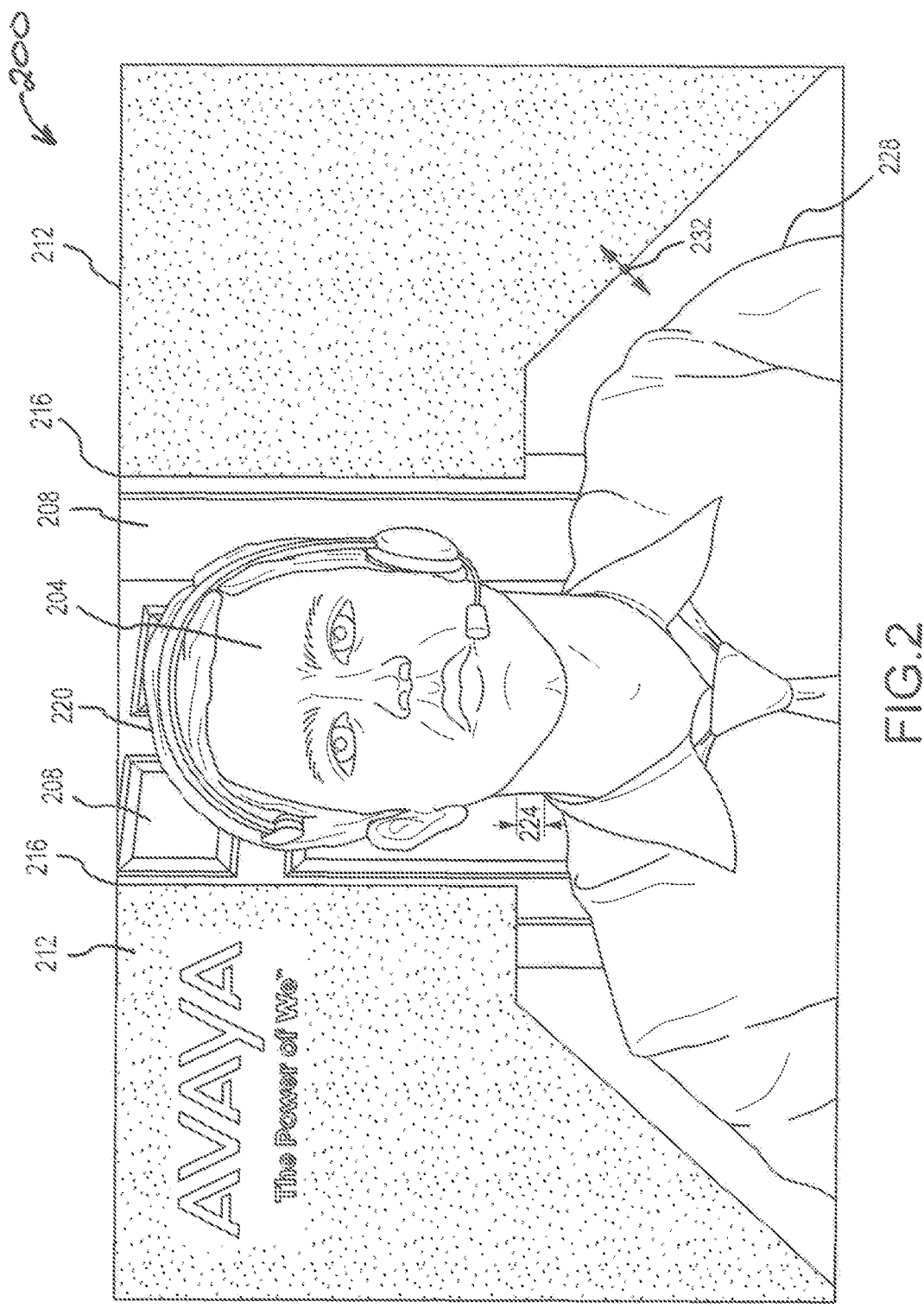
FIG. 2 is a captured participant image output by a conferencing component according to the embodiment.

FIG. 2 depicts an example screenshot 200 of modified image information. As can be seen from FIG. 2, the modified image information includes the local participant's image 204, original background image information 208 surrounding the participant, and replaced background image information 212 on either side of the local participant. The replaced background information includes a brand name (e.g., "Avaya The Power of We") associated with the local participant. Typically, rough segmentation replaces no more than about 99%, more typically no more than about 98%, and even more typically no more than about 95% of the original background image pixels in the frame. The replacement of only a portion of the background image pixels provides semi-background image replacement. Semi-background image replacement is generally not designed to handle all the use cases of precise or full background replacement, as it often cannot be used to change the scenery in which the user is located. For example, it generally cannot appear as if the user is at the beach. However, it can still handle the use cases of privacy at home, virtual roll-up, branding, and more, which can be important for visual communication in business environments.

In some applications, the boundary 216 of the replaced background image information includes one or more user selected points, such as an affordance, to enable the local participant to move the spatial position of the boundary 216 in a selected direction (as shown by exemplary point 232 in FIG. 2) to realize the desired degree of background image information replacement, e.g., desired degree of privacy or blockage of background information. The point can be selected by a user digit on a touchscreen, a mouse cursor, or a stylus and moved tactically by the user closer or further away from the local participant's image, as desired.

Figure 3:
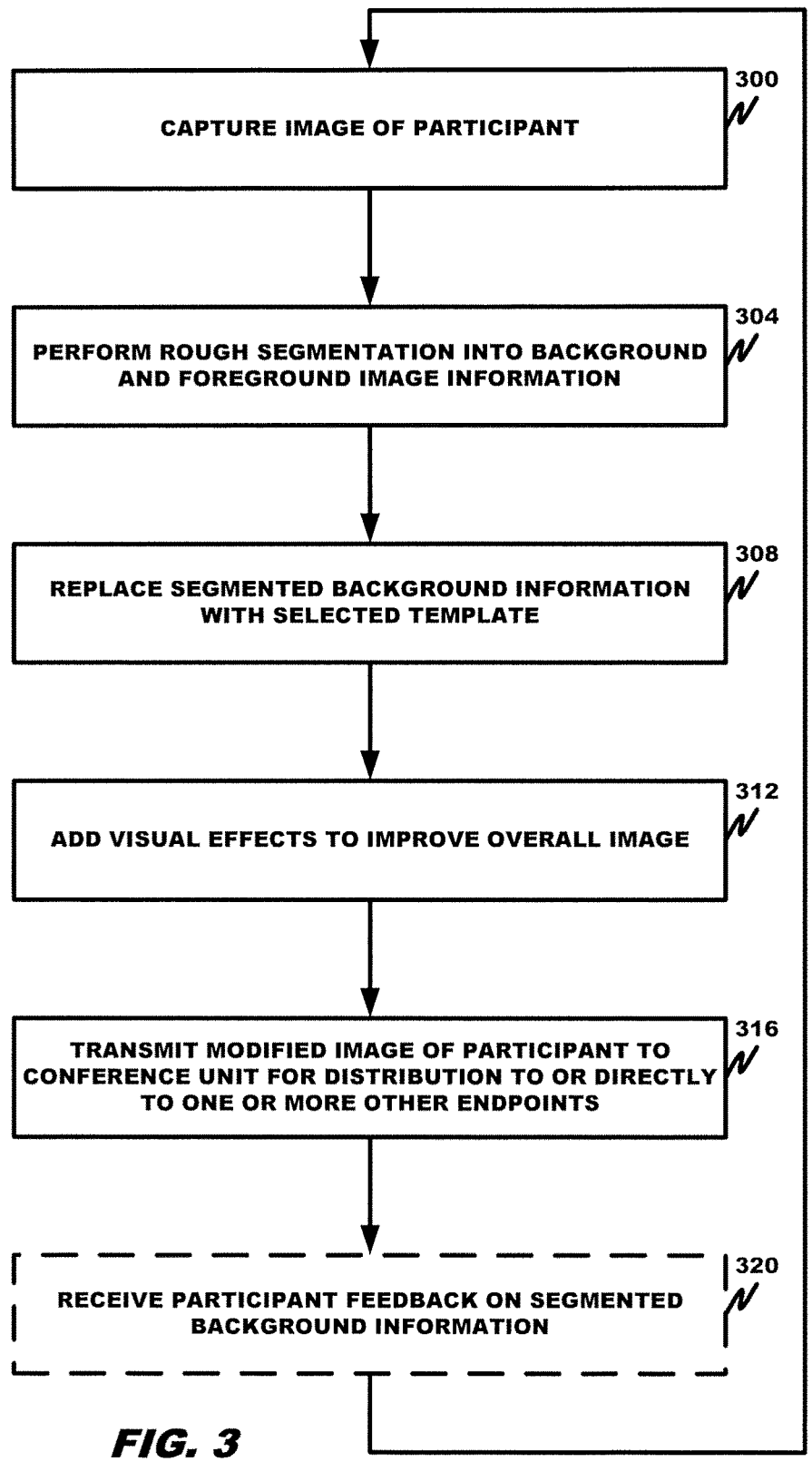
FIG. 3 is a flow chart depicting image processing logic according to the embodiment.

Referring to FIG. 3, the logic of the background modifier 120 will now be discussed.

In step 300, a still or video image of the local participant is captured by the image capture system 116 to provide captured image information. The captured image information includes both background and foreground image information.

In step 304, the background modifier 120 performs rough segmentation to divide the image information into two sets, a first set of pixels corresponding to the local participant image (or foreground image information) and background information that is not to be replaced and a second set of pixels corresponding to background information to be replaced with the selected template. Rough segmentation is not pixel value-based and can be performed when the rough edges of the object of interest (e.g., the local participant's image) are identified or estimated by computation.

A first sub-operation of the background modifier 120 in rough segmentation determines an-picture profile of the local participant. This is done using a face detection algorithm that produces a rectangle around the face. An example of a face detection algorithm is the Viola-Jones or KLT detection algorithm. The rectangle is typically tight enough in size that it can be considered as the face size, with some statistical variance that can be taken into consideration when estimating head/hair size. Face detection algorithms normally perform inside a sliding window of a specific size. To obtain a detection of a tight rectangle around the face, face detection algorithms are applied to a pyramid of images that are created with different scaling factors from the original image. In this way, the face is detected at its actual size.

In 2-dimensional camera images, or images generated by one 2-dimensional camera, there can be limitations of the angle in which the local participant is facing the camera. The background modifier 120 can identify one frame in which the local participant's face is detectable.

Once the face is detected and marked with the surrounding rectangle (or other geometrical shape), a second sub-operation of the background modifier 120 is to determine the proportion of head and shoulders with respect to the face using known spatial relationships. For example, the outer boundary 220 of the hair of the local participant is approximately one-fourth of the width of the rectangle around the head of the local participant, the neck length 224 is approximately one-fourth of the height of the rectangle and the shoulder line 228 width and hand width (or the boundary of the local participant's shoulders and hands) is about two head lengths (or twice the height of the rectangle for a male and about twice the width of the rectangle on a female.

Rough segmentation does not require precise segmentation on a pixel value-by-pixel value basis or complex computation as in prior art techniques. As will be appreciated, precise segmentation of pixels into foreground and background pixel sets requires the analysis not only of the spatial coordinates of the selected pixel but also of pixel value(s) associated with the image portion sample at the pixel location. In rough segmentation, the segmentation of the pixels into foreground and background pixel sets is based on the spatial coordinates of the selected pixel alone and is independent of the pixel value(s) of the selected pixel. In rough segmentation, the rectangle around the local participant can be less or more tight to his or her face, though obviously tighter is frequently more desirable.

Tracking the movement of the local participant across multiple video frames is a further sub-operation of the background modifier 120. This is done by identifying a facial feature to track. For example, the background modifier 120 can use a selected shape, texture, or color of the detected face for tracking. The background modifier 120 selects a facial feature that is unique to the object and remains invariant even when and as the object moves. A histogram-based tracker can use a CAMShift algorithm, which provides the capability to track an object using a histogram of pixel values.

For example when the tracked facial feature is a hue channel extracted from the nose region of the detected face, the hue channel pixel values (or a selected skin tone) are extracted from the nose region of the detected face. These pixel values are used to initialize the histogram for the tracker. The example then tracks the object over successive video frames using this histogram.

In selected frames, the background modifier 120 detects the face and, applying the various sub-operations, identifies the background image information or pixels to be replaced. Combining recurrent face detection (at changing frequencies, not every frame), with tracking can obtain smooth face detection in video, which is robust to noises and head movements. Local participant movements can require careful handling to obtain an acceptable quality of visual experience, as the segmentation appears to look like a frame surrounding the person, and not like a new background to which the user is in front of, as in precise segmentation. The frame should therefore be moving in a smooth and easy-on-the-eye manner when the user moves, and be moving off course as little as possible. The algorithmic solution is a combination between smooth movement and stabilized frame: on the one hand, one would not want to move the frame with every small movement and, on the other hand, one would not want to stall too much in moving the frame, which might lead to undesired jumps in the frame location. Therefore, the background modifier 120 monitors changes in local participant position, and once the local participant movement reaches a threshold degree of displacement from a previously segmented location, it would change the frame, not immediately to the new position, but with a smooth transition over a short period of time (or over multiple frames).

In step 308, the background modifier 120 replaces the segmented background information in the second set of pixels with the selected template and combines the first and second set of pixels to form modified image information. As noted, the selected template can have one or more pixel values providing any suitable appearance. The appearance can be a solid color, a mixture of colors, an image or collection of images, a promotional roll-up, a brand name or other branding material, a logo, and any combination thereof (as a single image or as a video).

In step 312, the background modifier 120 adds visual effects to improve the overall image in the modified image information. There are many visual effects that can be used. The background modifier can apply graphical and artistic effects to obtain high quality visual stitching between the new background and the original image. By way of illustration, the background modifier can (alpha) blend the boundaries between the foreground and the background image information to create a transparent transition effect. The background modifier can obtain high quality visual coherency between two stitched images. By way of illustration, the background modifier can modify the color and lighting of the background to resemble more those of the original pictures (or sometimes to contrast them).

In one example, visual effects are added using general photo border effects such as those created by PHOTOSHOP™. These effects can include, for example, adding one or more additional layers between the boundary 216 and the unreplaced background image information 208 to smooth the transition, adding additional canvas space at the boundary 216, adding a layer mask at the boundary 216, and applying a spatter, glass, sprayed strokes, or other filter to the boundary image information.

In step 316, the modified image information is displayed locally to the local participant and/or transmitted to the conference unit 104 for distribution to one or more other endpoints or directly to one or more other endpoints.

In optional step 320, the local participant can provide feedback to the background modifier 120 on the desired spatial position of the boundary 216 on either side of the local participant's image. The feedback is used by the background modifier in a later frame in segmenting unwanted background image information from the local participant's image.

Figure 5:
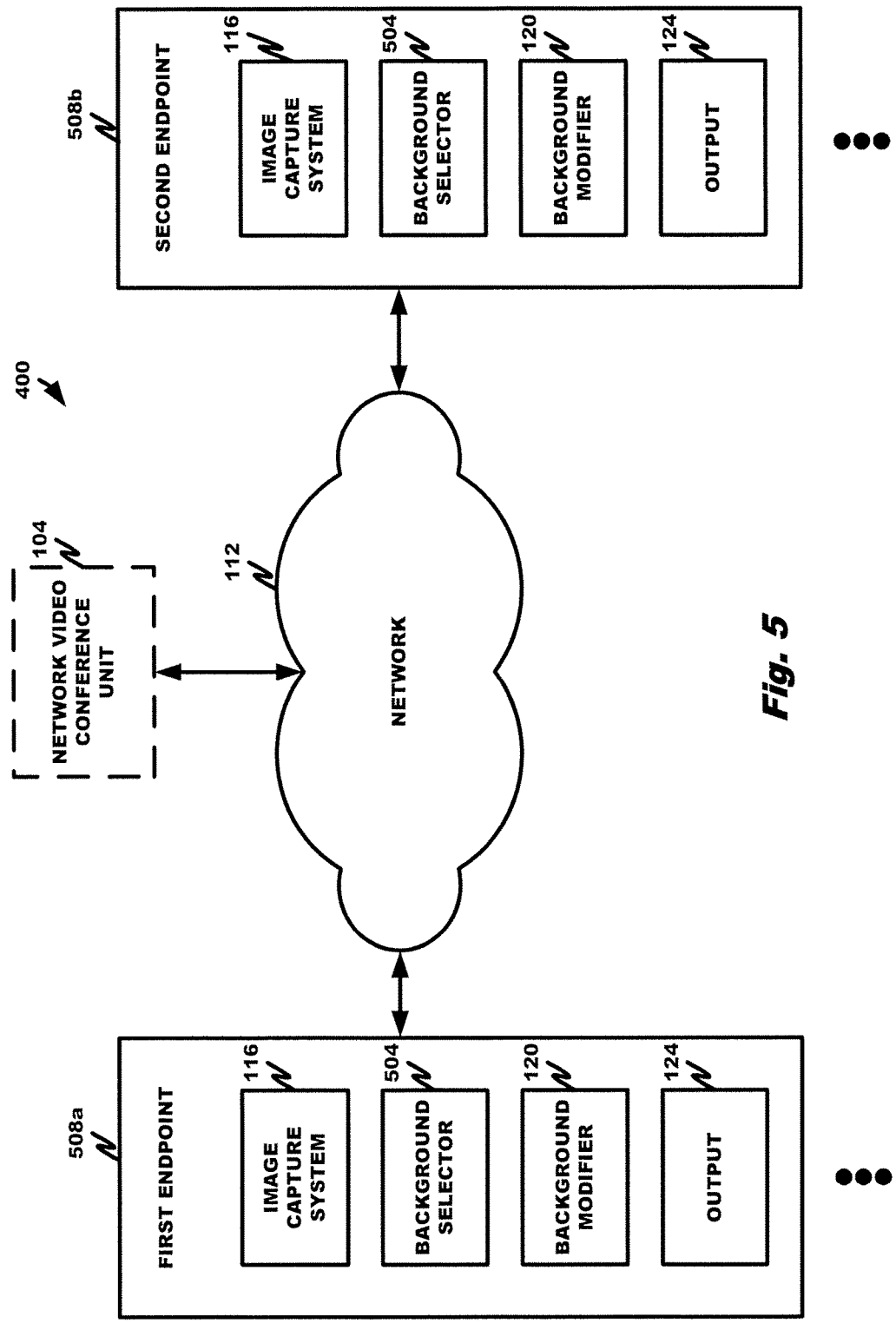
FIG. 5 is a block diagram depicting a system configuration according to an embodiment of the disclosure.

The template, or template set of pixels, may be selected by the selected endpoint (outputting the modified image information) based on one or more attributes of the other user. The attributes can be preset by the user or system administrator. As shown in the conferencing system 500 of FIG. 5, each of the first and second endpoints 508*a,b* can include a background selector 504 that selects a template for the modified image information (having a new or substituted background) based on an attribute of the other user or his or her endpoint, which attribute, in the configuration of FIG. 5, is the identity of the user of the other of the first and second endpoints 508*a,b* or electronic address of his or her corresponding endpoint. Where multiple other users are parties to the communication session and different templates are to be selected for each of the other users, the background selector 504 can provide different modified image information containing the appropriate template to the communication device of each of the other users. Alternatively, a single or common set of modified image information can be provided to the endpoints of all of the other users depending on user selected conflict resolution rules even when the user preference rules otherwise require one or more of the endpoints of other users to receive a different set of modified image information.

In another system configuration, the template, or template set of pixels, is selected by the network video conference unit 104 based on one or more attributes of the other user. A network video conference unit 104 can select the template automatically on top of what is being performed at the endpoint generating the image information. For example, the endpoint can turn all background pixels to a common color, such as black or white, and the network video conference unit 104 can embed the template or template set of pixels, such as a logo and branding information, in the background according to a caller attribute, such as caller identity. This has the advantage that the network video conference unit 104 is aware of the caller identity and therefore can effectively handle template selection and application to the image information.

The attribute can be any attribute of the other user and/or his or her communication device, including without limitation an identity of the other user, an association of the other user to the subject user (being imaged by the selected endpoint), another person, or organization (e.g., a friend, a family member, an employer, and the like), an electronic address associated with a communication device of the other user (such as the other party's endpoint), and combinations thereof.

The background selector 504 in the selected endpoint can determine the attribute by many techniques. It can be determined based on a signal flow between the first and second endpoints, such as by inspecting a packet header, trailer and/or payload received from the other endpoint or the network video conference unit 104, input received, by the first or second endpoint, from the user or user of the selected or other endpoint, face recognition of the image of the other party received by the selected endpoint from the other user's endpoint, content analysis of audio information and/or video information of the telecommunication session, content analysis of a presentation displayed during the telecommunication session, and the like. As an example of using content analysis of audio information and/or video information of the telecommunication session, or content analysis of a presentation displayed during the telecommunication session to select a template, speech recognition can be used to detect one or more trigger words or phrases spoken or displayed during the telecommunication session, which cause the template to change dynamically in response thereto. The background selector 504 can use such an attribute to obtain one or more other attributes used in template selection, such as from a corporate database (e.g., when the users both work for a common enterprise), from a social network in which the other user is a member, and the like.

The background selector 504 selects the template by mapping the one or more attributes of the other user or his or her communication device against a data structure indexing plural templates against one or more respective sets of user attributes, each attribute set corresponding to one or more users. For example, the user can select customized templates for different types of users, such as friends, family, co-workers, clients or customers, and/or strangers (or unknown or unrecognized users). Alternatively or additionally, the background selector 504 can apply user-specified preference rules or policies, such as a white list or blacklist, that selects a first template for a first group of listed users and a second template for a second set of unlisted users or vice versa.

Figure 6:
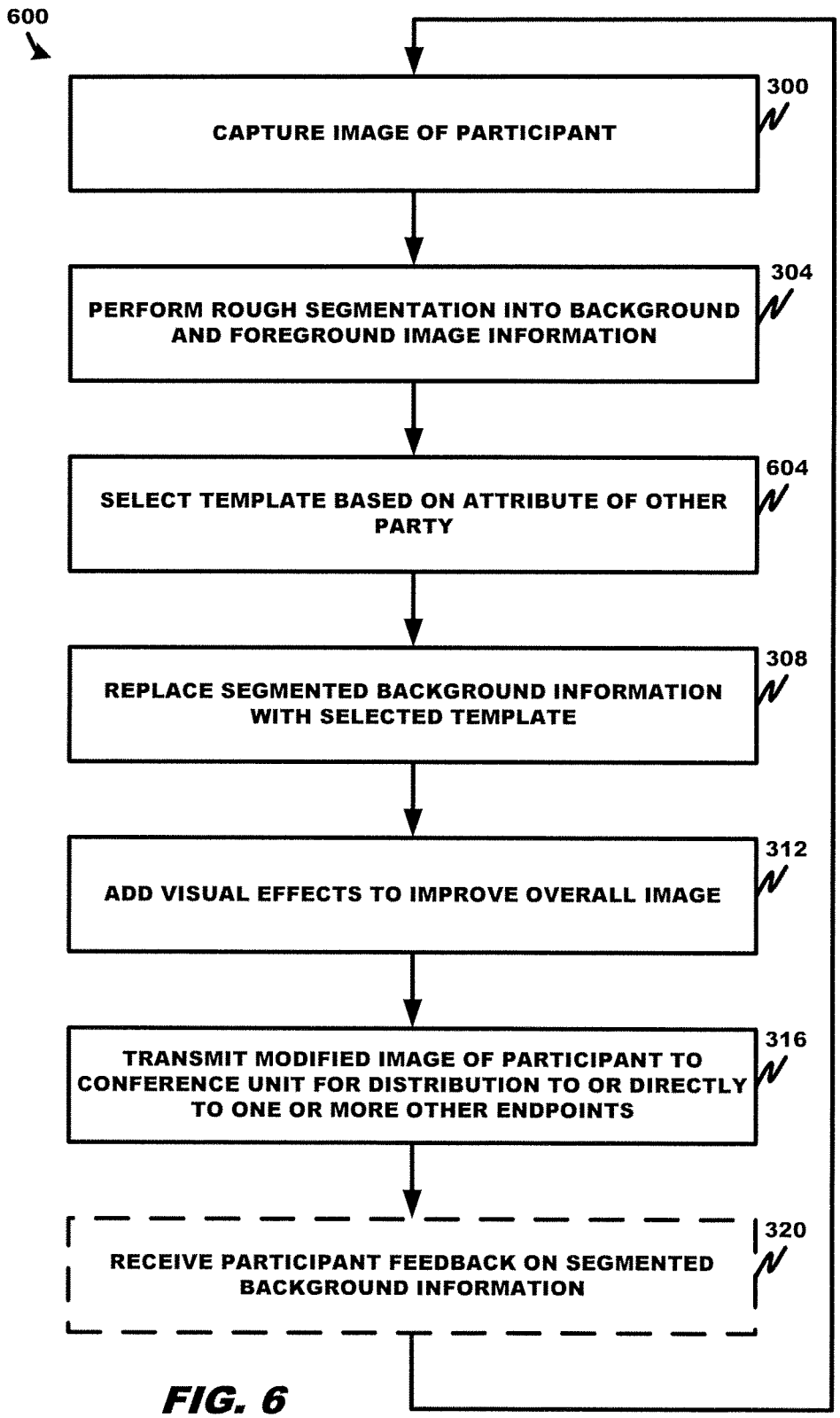
FIG. 6 is a flow chart depicting image processing logic according to the embodiment.

FIG. 6 shows how the logic flow of FIG. 3 is modified to accomodate the background selector 504. With reference to the logic flow 600 of FIG. 6, the background selector 504, in step 604, selects the template based on the attribute of the other user or his or her communication device, which is, in later steps, used to replace the segmented background information and form modified image information.

Figure 7:
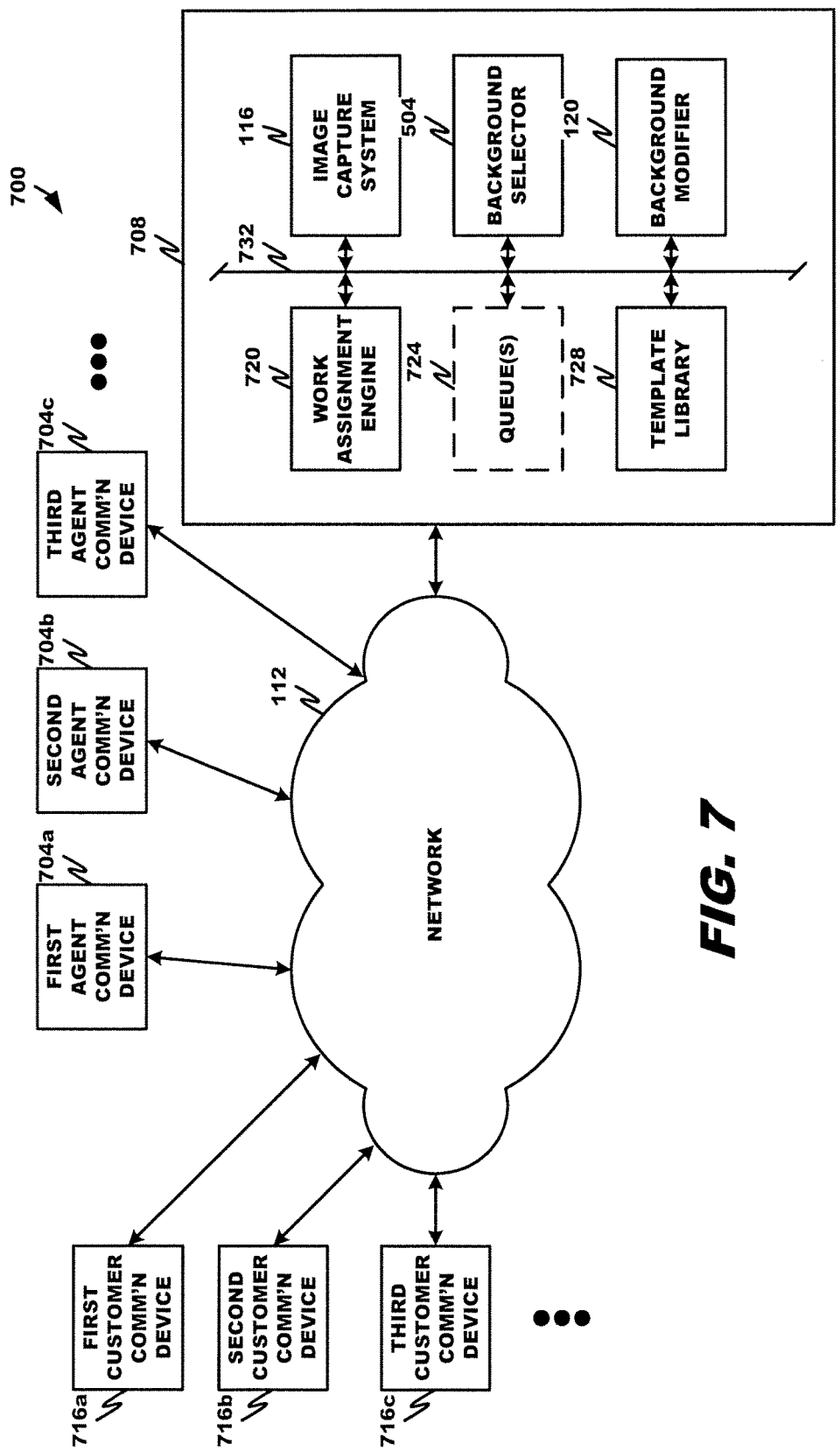
FIG. 7 is a block diagram depicting a system configuration according to an embodiment of the disclosure.

The background selector 504, and the image capture system 116 and background modifier 120, can be used in other applications, such as for video calls involving agents in a contact center servicing contactees or contactors. With reference to FIG. 7, a contact center 700 comprises first, second, third agent communication devices 704*a-c*, . . . of contact center agents and a server 708 in communication, by network 112, with first, second, third, customer communication devices 716*a-c*, . . . of customers. The first, second, and third customer communication devices 716*a, b, c*, . . . and first, second, and third agent communication devices 704*a-c*, . . . can be any suitable devices for providing a user interface for a voice and/or video communication session.

The contact center server 708 can include a work assignment engine 720 to assign work items, such as incoming and/or outgoing contacts from or to customer communication devices, to one of the first, second, and third agent communication devices 704*a-c*, . . . for servicing by an agent, one or more optional queue(s) 724 to hold waiting work items until an agent is available for servicing, a template library 728 to hold plural templates for use as the segmented background information in an image of an agent sent by the contact center 700 to a customer communication device of a customer being serviced by the agent, the image capture system 116 to capture an image of the servicing agent, the background selector 504 to select, from the template library 728, a template based upon one or more attributes of the customer or the customer communication being serviced, and the background modifier 120 to add, to the modified image information of the servicing agent, one or more visual effects to improve the overall image in the modified image information, all interconnected by a network 732, such as a local area network. While the image capture system 116, background selector 504, and background modifier 120 are shown in the contact center server 708, it will be understood that one or more of these components can be located at the agent communication device.

The attribute used in template selection is not limited to an attribute of the customer communication device or customer being serviced but can include the destination electronic address of the customer communication device.

The attribute can be collected not only from inspection of the signal flows exchanged with between the contact center and customer communication device but also from an earlier interaction of the customer with a contact center resource, such as an interactive voice response ("IVR") unit, another agent, a web server of the contact center, and the like, or a contact center database (not shown) containing customer information.

In one example, a contact center agent, who works remotely from home on a bring-your-own-device model, receives video calls on behalf of contact centers of several different client organizations. For instance, the contact center agent can work as an agent for several different client organizations or one organization that contracts out contact center services to other different client organizations. The attribute of an incoming video call used in selecting a template can be the destination electronic address. As will be appreciated, the destination electronic address can be associated with a different one of the client organizations or a specific product or service of one of the client organizations, e.g., Amazon™, Uber™, Target™, etc., Based upon which client organization the incoming caller is calling, the template is selected to change the agent's background to the corresponding client organization's logo, current promotional deals, etc. These can be selected by the agent at the agent communication device level or pushed by the contact center server to the agent's communication device. If the agent were to receive a personal incoming video call, the agent can set a template either preselected by the agent or selected as the agent sees the call coming in. These templates can be canned and preselected by the agent or uploaded images that the agent uploads. The template is typically selected based upon the caller (e.g., as business or personal).

As will be appreciated, the video call is not limited to incoming calls but also can be an outgoing video call. In that event, the template is selected before the call is initiated based upon what client organization or product or service the contact is being made on behalf of.

The destination electronic address or source electronic address can be used in template selection. For example, a multi-service agent can be routed calls from different client organizations (e.g., Target™, Sears™, Uber™, etc.) based upon the number dialed. By way of illustration, Target™ can have a call center call number for a particular geographical or spatial region in which the customer is physically located at the time of the call or for a particular product or service or promotion. These contacts can be funneled or routed to an agent and agent communication device, based upon best match (e.g., based upon call in number for a region, time zone, language spoken, expertise of agent, etc.). The agent may receive various calls for different client organizations (e.g., Target™, Uber™, Sears™, etc.). The contact center server typically determines the client organization based upon the number dialed or link clicked by the contacting customer, and the contact center server alerts the agent regarding which client organization the call is coming in for. The contact center server can push the selected template to the agent communication device for use in the video call with the contacting customer. Alternatively, if the central system were to notify the agent that the incoming call is for a selected client organization, the agent can select the template at video/call pick-up or the agent or contact center administrator can create preselected backgrounds that are pulled up by the agent's local communication device based upon the client organization or particular product or service or promotion designated by the inbound call. Similarly, the agent can select the template based upon the client organization being served in an outbound video call.

Any undesignated inbound or outbound video call can have a generic template selected and/or created by the agent. When the background selector is uncertain about which template to select from the template library for an undesignated inbound or outbound video call, the contact center server can query the agent, such as with a pop-up on the agent's display, for an agent-selected template to select from the template library before the contact center server sends the video call to the called customer communication device or receives the video call from the calling customer communication device and provides the modified image information of the agent to the calling customer communication device.

There could be a pool of potential generic templates (A, B, C, . . . N) that client organizations can select as a preapproved backgrounds. For example, client organization X indicates that it approves of generic templates (A, D, E and N); client organization Y indicates that it approves of generic templates (D, E, and L); and client organization Z indicates that it approves of all available generic templates. If an unidentified inbound/out bound video call is made, the common preapproved generic template (D or E) will be displayed. If the client organization for the inbound/outbound video call is identified, the corresponding template will display for the designated client organization. As will be appreciated, the foregoing examples are not limited to client organizations but can apply to products and/or services and/or promotions of a common organization.

The contact center server can override preselected templates for temporary templates selected for regional, seasonal, promotional, or emergency situations.

The logic applied by the contact center server and/or agent communication device is a modified form of that shown in FIG. 6. The modifications include capturing the image of the agent (step 300), selecting the template based on an attribute of the customer or the customer communication device (step 604), transmitting the modified image of the agent to the communication device of the customer (step 316), and (optionally) receiving from the agent feedback on the segmented background information (step 320).

The above concepts can apply not only to partial but also to complete background replacement. Complete background replacement can be done based on a 2D image or video created using a green/blue screen as background, a video/image editor that use a video/image editing manual software, an external service provider that may offer to provide full or partial service of creating and editing a video/image for a user, and/or a 3D image or video of the local participant or agent.

The above concepts can apply not only to a video of a participant containing a background but also to a still image of a participant containing a background.

The concepts can be applied not only to replacement of a background object with a new background set of objects to an original foreground set of objects but also to replacement of a foreground set of objects with a new foreground set of objects to the original background set of objects.

Figure 4:
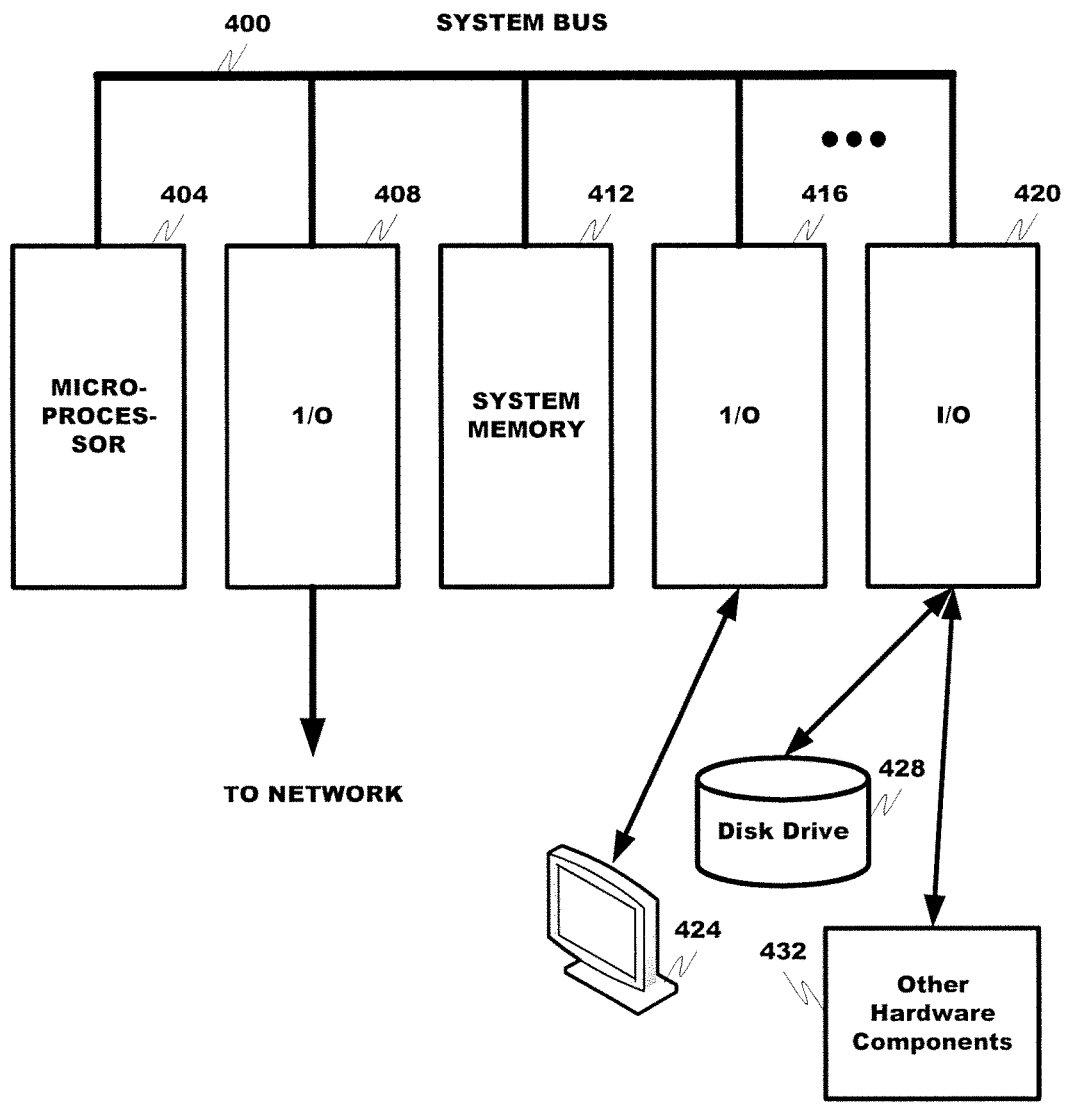
FIG. 4 is a block diagram of a computational system to execute the image processing logic of FIG. 3.

The subject matter of the disclosure can be implemented through a computer program operating on a programmable computer system or instruction execution system such as a personal computer or workstation, or other microprocessor-based platform. FIG. 4 illustrates details of a computer system that is implementing the teachings of this disclosure. System bus 400 interconnects the major hardware components. The system is controlled by microprocessor 404, which serves as the central processing unit (CPU) for the system. System memory 412 is typically divided into multiple types of memory or memory areas such as read-only memory (ROM), random-access memory (RAM) and others. The system memory 412 can also contain a basic input/output system (BIOS). A plurality of general input/output (I/O) adapters or devices 408, 416, and 420 are present. Only three, namely I/O adapters or devices 408, 416, and 420, are shown for clarity. These connect to various devices including a fixed disk drive 428, network 112, a display 424, and other hardware components 432, such as a diskette drive, a camera or other image capture device, a keyboard, a microphone, a speaker, and the like. Computer program code instructions for implementing the functions disclosed herein can be stored in the disk drive 428. When the system is operating, the instructions are at least partially loaded into system memory 412 and executed by microprocessor 404. Optionally, one of the I/O devices is a network adapter or modem for connection to the network, which may be the Internet. It should be noted that the system of FIG. 4 is meant as an illustrative example only. Numerous types of general-purpose computer systems are available and can be used. When equipped with an image capturing device, a microphone and a speaker, the computer system may be used to implement a conference endpoint.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Elements of the disclosure can be embodied in hardware and/or software as a computer program code (including firmware, resident software, microcode, etc.). Furthermore, the disclosed elements may take the form of a computer program product on a computer-usable or computer-readable (storage) medium having computer-usable or computer-readable program code embodied in the medium for use by or in connection with an instruction execution system, such as the one shown in FIG. 4.

Any of the steps, functions, and operations discussed herein can be performed continuously and automatically.

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The exemplary systems and methods of this disclosure have been described in relation to a simplistic distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the teachings of this disclosure can be implemented as a distributed or undistributed multipoint conferencing system. A distributed multipoint conferencing system is a multipoint conferencing system that includes more than one conference server. An undistributed multipoint conferencing system is a multipoint conferencing system that includes only one conference server.

In another alternative embodiment, the principles of this disclosure are used in a videophone call between two or more parties.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A telecommunication device, comprising:
   a microprocessor; and
   a memory coupled with the processor and storing therein a set of instructions which, when executed by the microprocessor, cause the microprocessor to:
   receive an image of a local participant in a telecommunication session, the image being captured by an image capture device and comprising foreground and background images defined by plural pixels, each of the plural pixels having a pixel magnitude related to a sample of the image at a spatial location of the respective pixel;
   segment the plural pixels of the captured image into foreground and background sets of pixels;
   select a template set of pixels from among multiple template sets of pixels based on an attribute of a remote endpoint or remote participant associated with the remote endpoint;
   replace the background set of pixels with the selected template set of pixels to form a new background set of pixels, selected pixels in the template set of pixels having a different magnitude than a magnitude of the corresponding pixel in the background set of pixels replaced by the template set of pixels,
   combine the new background set of pixels with the foreground set of pixels to form modified image information; and
   provide the modified image information to the remote endpoint and/or to a display to display the modified image information to the local participant.

2. The device of claim 1, wherein the image capture device is a camera, wherein the instructions cause the microprocessor to segment the plural pixels of the captured image into foreground and background sets of pixels based on spatial coordinates of the pixels and independent of pixel magnitudes, wherein the pixel magnitude is one or more of a pixel value, color plane, and colormap index of the corresponding pixel, wherein the foreground image comprises pixels defining an image of the local participant, wherein the background image comprises pixels defining one or more background objects, wherein the foreground set of pixels comprises pixels defining the image of the local participant and part of the one or more background objects, and wherein the background set of pixels comprises pixels defining the other part of the one or more background objects.

3. The device of claim 2, wherein the image capture device is a camera, wherein the segmentation is based on a selected boundary dividing the background image into first and second subsets of background image information, pixels in the first subset of background image information being in the foreground set of pixels and pixels in the second subset of background image information being in the background set of pixels, and wherein a spatial position of the boundary is related to a dimension of a detected face of the local participant.

4. The device of claim 3, wherein a spatial position of the boundary spatially moves across multiple frames based on movement of the local participant, wherein movement of the local participant is tracked by the microprocessor tracking movement of a selected facial feature of the local participant, and wherein the boundary spatially moves only when a degree of spatial displacement of the local participant image from a selected position is equal to or greater than a selected threshold.

5. The device of claim 3, wherein the instructions cause the microprocessor to modify magnitudes of the pixels at the selected boundary to provide a desired visual effect and wherein at least some of the pixels having modified magnitudes are in the foreground set of pixels and/or at least some of the pixels having modified magnitudes are in the new background set of pixels.

6. The device of claim 3, wherein input of the local participant is received to alter a spatial position of the boundary from a first position selected automatically by the background modifier to a second position selected manually by the local participant.

7. The device of claim 1, wherein the attribute of a remote endpoint or remote participant associated with the remote endpoint is an identity of the remote participant, an association of the remote participant to the local participant or another entity, an electronic address associated with the remote endpoint, or a combination thereof, wherein the instructions causes the microprocessor to determine the attribute from a signal exchanged between the local and remote endpoint, input received by the local endpoint from the local or remote participant, face recognition based on an image of the remote participant, content analysis of audio information and/or video information of the telecommunication session, content analysis of a presentation displayed during the telecommunication session, or a combination thereof, and wherein the instructions cause the microprocessor to select the template set of pixels from among multiple template sets of pixels by mapping the determined attribute against associations of sets of one or more attributes against a corresponding template set of pixels.

8. A method, comprising:
automatically capturing, by an image capture device, an image of a local participant in a telecommunication session, the image comprising foreground and background images defined by plural pixels, each of the plural pixels having a pixel magnitude related to a sample of the image at a spatial location of the respective pixel;
automatically segmenting, by a microprocessor and in substantial real time with image capture, the plural pixels of the captured image into foreground and background sets of pixels;
automatically selecting, by the microprocessor, a template set of pixels from among multiple template sets of pixels based on an attribute of a remote endpoint or remote participant associated with the remote endpoint;
automatically replacing, by the microprocessor, the background set of pixels with the selected template set of pixels to form a new background set of pixels, pixels in the selected template set of pixels having a different magnitude than a magnitude of the corresponding pixel in the background set of pixels replaced by the pixel in the selected template set of pixels;
automatically combining, by the microprocessor, the new background set of pixels with the foreground set of pixels to form modified image information; and
providing, by an output, the modified image information to the remote endpoint and/or to a display to display the modified image information to the local participant.

9. The method of claim 8, wherein the microprocessor automatically segments, in substantial real time with image capture, the plural pixels of the captured image into foreground and background sets of pixels based on spatial coordinates of the pixels and independent of pixel magnitudes, wherein the image capture device is a camera, wherein the pixel magnitude is one or more of a pixel value, color plane, and colormap index of the corresponding pixel, wherein the foreground image comprises pixels defining an image of the local participant, wherein the background image comprises pixels defining one or more background objects, wherein the foreground set of pixels comprises pixels defining the image of the local participant and part of the one or more background objects, and wherein the background set of pixels comprises pixels defining the other part of the one or more background objects.

10. The method of claim 9, wherein the segmentation is based on a selected boundary dividing the background image information into first and second subsets of background image, pixels in the first subset of background image information being in the foreground set of pixels and pixels in the second subset of background image information being in the background set of pixels, and wherein a spatial position of the boundary is related to a dimension of a detected face of the local participant.

11. The method of claim 10, wherein a spatial position of the boundary spatially moves across multiple frames based on movement of the local participant, wherein movement of the local participant is tracked by tracking, by the microprocessor, movement of a selected facial feature of the local participant, and wherein the boundary spatially moves only when a degree of spatial displacement of the local participant image from a selected position is equal to or greater than a selected threshold.

12. The method of claim 10, wherein the microprocessor modifies magnitudes of the pixels at the selected boundary to provide a desired visual effect and wherein at least some of the pixels having modified magnitudes are in the foreground set of pixels and/or at least some of the pixels having modified magnitudes are in the new background set of pixels.

13. The method of claim 8, wherein the attribute of a remote endpoint or remote participant associated with the remote endpoint is an identity of the remote participant, an association of the remote participant to the local participant or another entity, an electronic address associated with the remote endpoint, or a combination thereof, wherein the the microprocessor determines the attribute from a signal exchanged between the local and remote endpoint, input received by the local endpoint from the local or remote participant, face recognition based on an image of the remote participant, content analysis of audio information and/or video information of the telecommunication session, content analysis of a presentation displayed during the telecommunication session, or a combination thereof, and wherein the microprocessor selects the template set of pixels from among multiple template sets of pixels by mapping the determined attribute against associations of sets of one or more attributes against a corresponding template set of pixels.

14. A contact center, comprising:
a microprocessor; and
a non-transitory computer readable medium, coupled to the microprocessor, that comprises instructions which, when executed by the microprocessor, cause the microprocessor to:
assign work items, the work items comprising video calls with customer communication devices, to selected ones of agent communication devices to service the assigned work items;
receive a captured image of an agent from an agent communication device, the agent communication device selected for a telecommunication session with a selected customer communication device, the image comprising foreground and background images defined by plural pixels, each of the plural pixels having a pixel magnitude related to a sample of the image at a spatial location of the respective pixel;
select a template set of pixels from among multiple template sets of pixels based on an attribute of the selected customer communication device or a customer associated with the selected customer communication device;
segment the plural pixels of the captured image into foreground and background sets of pixels based on spatial coordinates of the pixels;
replace the background set of pixels with the selected template set of pixels to form a new background set of pixels;
combine the new background set of pixels with the foreground set of pixels to form modified image information; and
provide the modified image information to the selected customer communication device.

15. The contact center of claim 14, wherein the captured image is a 2-dimensional image, wherein the pixel magnitude is one or more of a pixel value, color plane, and colormap index of the corresponding pixel, wherein the foreground image comprises pixels defining an image of a local participant, wherein the background image comprises pixels defining one or more background objects, wherein the foreground set of pixels comprises pixels defining the image of the local participant and part of the one or more background objects, wherein each selected pixel in the template set of pixels having a different magnitude than a magnitude of the corresponding pixel in the background set of pixels replaced by the selected pixel, and wherein the background set of pixels comprises pixels defining the other part of the one or more background objects.

16. The contact center of claim 15, wherein the segmentation of the plural pixels into foreground and background sets of pixels is independent of pixel magnitudes and wherein the captured image is captured by a camera, wherein the segmentation is based on a selected boundary dividing the background image into first and second subsets of background image information, pixels in the first subset of background image information being in the foreground set of pixels and pixels in the second subset of background image information being in the background set of pixels, and wherein a spatial position of the boundary being related to a dimension of a detected face of the agent.

17. The contact center of claim 16, wherein a spatial position of the boundary spatially moves across multiple frames based on movement of the agent, wherein movement of the agent is tracked by tracking movement of a selected facial feature of the local participant, and wherein the boundary spatially moves only when a degree of spatial displacement of the agent image from a selected position is equal to or greater than a selected threshold.

18. The contact center of claim 17, wherein the instructions cause the microprocessor to modify magnitudes of the pixels at the selected boundary to provide a desired visual effect and wherein at least some of the pixels having modified magnitudes are in the foreground set of pixels and/or at least some of the pixels having modified magnitudes are in the new background set of pixels.

19. The contact center of claim 14, wherein the attribute of the selected customer communication device or customer associated with the selected customer communication device is an identity of the customer, an electronic address received from the selected customer communication device, an electronic address associated with the customer communication device, or a combination thereof, wherein the instructions causes the microprocessor to determine the attribute from a signal exchanged with the selected customer communication device, input received from the customer communication device, face recognition based on an image of the customer, content analysis of audio information and/or video information of the video call, content analysis of a presentation displayed during the video calls, or a combination thereof, and wherein the instructions cause the microprocessor to select the template set of pixels from among multiple template sets of pixels by mapping the determined attribute against associations of sets of one or more attributes against a corresponding template set of pixels.

20. The contact center of claim 14, wherein, when the attribute of the selected customer communication device or customer associated with the selected customer communication device is not associated with a template set of pixels in the multiple template sets of pixels, the instructions cause the microprocessor to query the selected agent communication device for a template set of pixels to be used in forming the modified image information and wherein the microprocessor uses, in forming the modified image information, the template set of pixels identified in a response received from the selected agent communication device.

* * * * *